(12) United States Patent
Greenwood et al.

(10) Patent No.: US 7,407,459 B2
(45) Date of Patent: Aug. 5, 2008

(54) CONTINUOUSLY VARIABLE RATIO TRANSMISSION SYSTEM

(75) Inventors: Christopher John Greenwood, Preston (GB); Thomas George Fellows, Headington (GB)

(73) Assignee: Torotrak (Development) Limited, Lancashire (GB)

( * ) Notice: Subject to any disclaimer, the term of this patent is extended or adjusted under 35 U.S.C. 154(b) by 88 days.

(21) Appl. No.: 10/515,803

(22) PCT Filed: May 28, 2003

(86) PCT No.: PCT/GB03/02332

§ 371 (c)(1),
(2), (4) Date: Sep. 6, 2005

(87) PCT Pub. No.: WO03/100295

PCT Pub. Date: Dec. 4, 2003

(65) Prior Publication Data

US 2006/0142110 A1    Jun. 29, 2006

(30) Foreign Application Priority Data

May 28, 2002 (EP) .................................. 02253727
May 28, 2002 (GB) .................................. 0212186.1

(51) Int. Cl.
*F16H 37/02* (2006.01)
(52) U.S. Cl. ........................................ 475/215; 475/219
(58) Field of Classification Search ................ 475/207, 475/209, 214–219, 339
See application file for complete search history.

(56) References Cited

U.S. PATENT DOCUMENTS

| 6,358,178 | B1 * | 3/2002 | Wittkopp ..................... 475/207 |
| 6,585,619 | B2 * | 7/2003 | Henzler ....................... 475/214 |
| 6,719,659 | B2 * | 4/2004 | Geiberger et al. ............ 475/216 |
| 2002/0019285 | A1 * | 2/2002 | Henzler ....................... 475/214 |
| 2002/0169048 | A1 * | 11/2002 | Henzler et al. ............... 475/214 |
| 2003/0181280 | A1 * | 9/2003 | Elser et al. ................... 475/207 |
| 2007/0042856 | A1 * | 2/2007 | Greenwood ................. 475/216 |

FOREIGN PATENT DOCUMENTS

DE    100 21 912 A    11/2001

* cited by examiner

*Primary Examiner*—Roger Pang
(74) *Attorney, Agent, or Firm*—Brooks Kushman P.C.

(57) ABSTRACT

A multi-regime continuously variable ratio transmission system has coaxial system input and output shafts (16, 24), a continously variable ratio transmission unit (V) connected coaxially to the system input shaft (16) and having a coaxial variator output shaft (18) and a mixing epicyclic gear train (E1) having an input sun gear (S1) drivably connected to the variator ouput shaft (18), a planet carrier (C1) drivably connected to the system input shaft (16) and a planet gear (P1) mounted on the planet carrier ((C1). The planet gear (P1) drives a first intermediate output shaft (22) arranged coaxially with the system input shaft (16) and selectively connectable to the system output shaft via a first clutch (H) in high-regime operation of the transmission. The planet gear (P1) also provides the input for a second epicyclic gear train (E2) having an output (C2) which is selectively connectable to the system output shaft via a braking element (L) for low-regime operation of the transmission. The arrangement minimises the number of gear meshes, thereby minimising transmission losses and the absence of an annulus in the mixing epicyclic gear train (E1) allows more freedom in the choice of gear sizes, thereby permitting reduced gear speeds.

20 Claims, 2 Drawing Sheets

CONTINUOUSLY VARIABLE RATIO TRANSMISSION SYSTEM

BACKGROUND OF THE INVENTION

1. Field of the invention

The present invention relates to continuously variable ratio transmission systems.

It is known to provide a continuously variable ratio transmission system having coaxial system input and output shaft and a continuously variable ratio transmission unit (known as a variator) connected coaxially to the system input shaft and having a coaxial variator output shaft. A mixing epicyclic gear train receives drives from the system input and from the variator output. By appropriate use of clutches or other braking elements, the system can operate in a high-gearing regime or low-gearing regime. Examples of such transmissions can be found in JP-A-6-174033 and JP-A-62-255655.

2. Background Art

Inevitably, small power losses arise from the intermeshing of gears. In order to maximise efficiency, it is therefore desirable to reduce the number of gear meshes, particularly in the mixing epicyclic gear train where the losses can effectively be magnified during operation in a "power recirculation" mode. It is thus an object of the present invention to provide a "coaxial" continuously variable ratio transmission of the type described with a reduced number of gear meshes.

The prior art "coaxial" arrangements also require relatively high gear speeds which in turn demand more expensive bearings and tend to increase wear. It is an object of the present invention to reduce such gear speeds.

SUMMARY OF THE INVENTION

In accordance with the present invention, there is provided a multi-regime, continuously variable ratio transmission system, comprising:

coaxial system input and output shafts;

a continuously variable ratio transmission unit (variator) connected coaxially to the system input shaft and having a coaxial variator output shaft; and a mixing epicyclic gear train having an input sun gear drivably connected to the variator output shaft, a planet carrier drivably connected to the system input shaft and a first planet gear mounted on the planet carrier and drivingly engaged with the input sun gear;

characterised in that the first planet gear drives a first intermediate output shaft which is arranged coaxially with the system input shaft and which is selectively connectable to the system output shaft via a first clutch in a high-regime operation of the transmission;

and in that the first planet gear provides the input for a second epicyclic gear train having an output which is selectively connectable to the system output shaft via a braking element in a low-regime operation of the transmission.

With the above arrangement, when the output of the second epicyclic gear train is connected to the system output shaft (which corresponds to low-regime operation) the number of meshing gears can be minimised, thereby minimising the losses which occur in the mixing epicyclic gear train, particularly when in a power recirculation mode. Moreover, the mixing epicyclic gear train of the above arrangement does not require an annulus or ring gear. This significantly reduces the physical size required for the mixing epicyclic gear set and, as a consequence, allows much greater flexibility with the selection of the relative sizes of the planet gear and planet carrier. The arrangement allows the selection of gears which permit the mixing epicyclic gear train to run at slower speeds as compared with the prior art arrangements, thereby reducing wear, minimising losses and reducing the demand on other components such as bearings.

The above arrangement also allows power recirculation to take place in high-regime operation of the transmission.

Preferably, the first intermediate output shaft is provided with a sun gear which is driven by the first planet carrier of the mixing epicyclic gear train. Preferably, the sun gear on the output shaft is the same size as the input sun gear.

The axle of the planet gear of the mixing epicyclic gear train preferably carries a second planet gear which rotates with the first planet gear and drives the first intermediate output shaft. Conveniently, the second planet gear is the same size as the first planet gear.

The axle of the first planet gear of the mixing epicyclic gear train may carry a third planet gear which rotates with the first planet gear and provides the input for the second epicyclic gear train.

The second epicyclic gear train preferably comprises a second input sun gear driven by the mixing epicyclic gear train, a planet gear driven by the second input sun gear and a planet carrier forming the output of the second epicyclic gear train.

Preferably the system further comprises intermediate gearing further connecting the mixing epicyclic gear train and the second input sun gear.

Preferably, the second epicyclic gear train comprises a second sun gear engaged with the planet gear of the second epicyclic gear train.

In one embodiment, the system comprises means for selectively braking the second sun gear. This may conveniently comprise a clutch interposed between the second sun gear and the transmission system casing.

In another embodiment, the sun gear is held stationary with respect to the transmission casing and the braking element comprises clutch means for selectively connecting the output of the second epicyclic gear train to the system output shaft.

BRIEF DESCRIPTION OF THE DRAWINGS

By way of example only, specific embodiments of the present invention will now be described, with reference to the accompanying drawings, in which.

Figure 1:
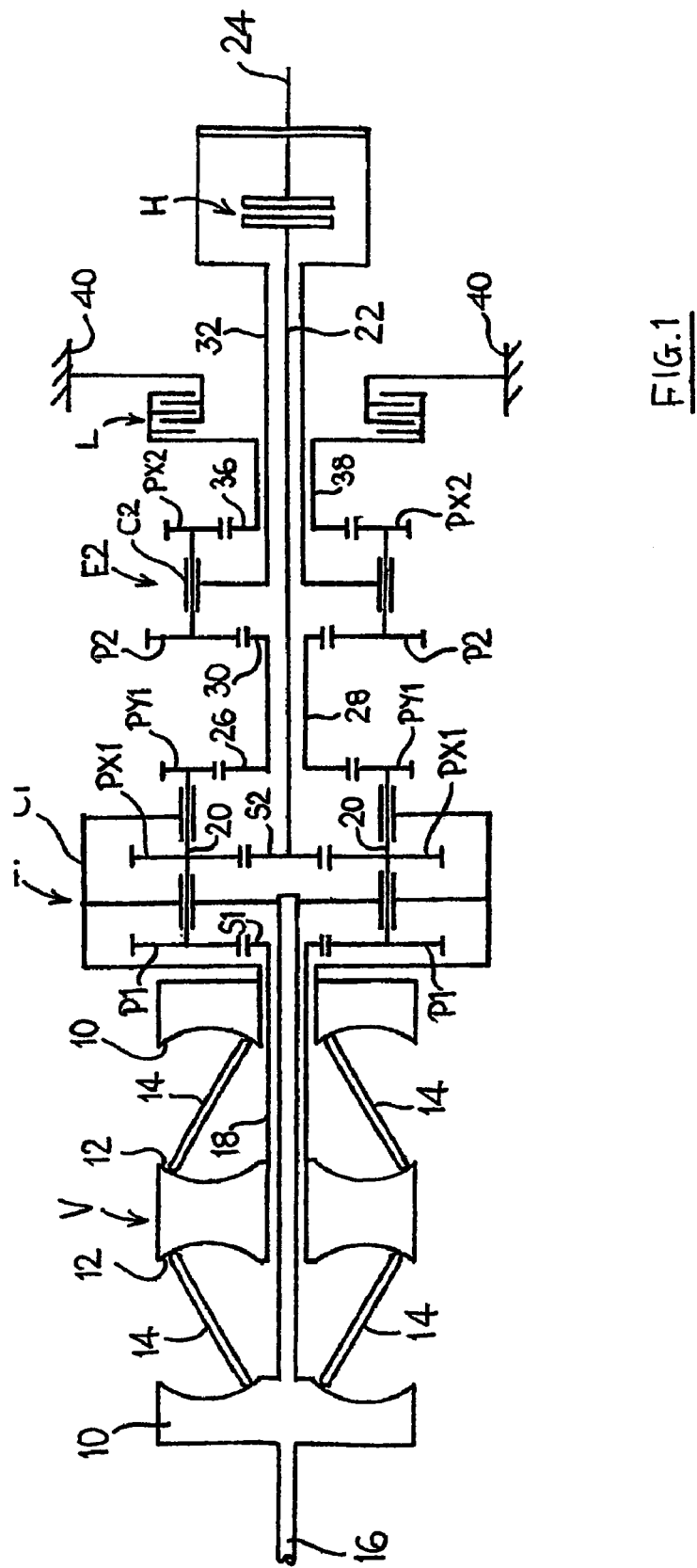
FIG. 1 is a diagrammatic illustration of a first embodiment of continuously variable transmission in accordance with the present invention.

Referring firstly to FIG. 1, a continuously variable ratio transmission system comprises a variator V of the known toroidal race rolling traction type having two toroidally-recessed discs 10 arranged one at each end of the unit and a pair of similar output discs 12, each facing a respective one of the input discs 10 and rotating with each other. Sets of rollers 14 are mounted between the opposing faces of the input and output discs 10, 12 to transmit drive from the input discs 10 to the output discs 12 with a ratio which is variable by tilting the rollers 14.

DETAILED DESCRIPTION OF THE PREFERRED EMBODIENT(S)

The input discs 10 are connected to and driven by a system input shaft 16. The variator provides an output via a tubular variator output shaft 18 which is arranged coaxially with the input shaft 16. The end of the shaft 18 remote from the variator V drives the sun gear S1 of a first, mixing epicyclic gear train E1. The carrier C1 of the gear train E1 is connected to, and driven by, the input shaft 16 and is also connected to the inner of the two variator input discs 10. The carrier C1 carries input planet gears P1 which engage with, and are driven by, the sun gear S1. The planet gears P1 are each mounted on the carrier C1 by means of an associated shaft 20 which additionally carries first and second output planet gears PX1 and PY1. Output planet gear PX1 is identical to planet gear P1 and transfers the summed output of the gear train E1 via an output sun gear S2 (of the same size as input sun gear S1) to an intermediate output shaft 22 arranged coaxially with the system input shaft 16. Drive from the intermediate output shaft can be selectively transmitted via a high-regime clutch H to a system output shaft 24.

Output planet gear PY1 is of smaller diameter than planet gears P1 and PX1 and meshes with a pinion 26 formed on one end of a tubular intermediate output shaft 28 arranged coaxially with the input shaft 16. The opposite end of the intermediate output shaft is also provided with a pinion 30 of smaller diameter than pinion 26. The pinion 30 meshes with larger diameter planet gears P2 of a second, simple reversing epicyclic gear set D2. The planet gears P2 are mounted on a carrier C2 which is connected to a second tubular intermediate output shaft 32 arranged coaxially with the system input shaft 16, and which in turn is connected to the system output shaft 24.

The planet gears P2 of the second epicyclic gear set E2 are each located at one end of a respective shaft 34 mounted in the carrier C2. The opposite end of each shaft 34 carries a further, smaller planet gear PX2 which mesh with a sun gear 36 located at one end of a tubular transfer shaft 38 arranged coaxially with the system input shaft 16. The other end of the transfer shaft 38 is connected to one side of a braking element in the form of a low-regime clutch L, the other side of which is connected to the transmission casing 40.

The transmission can operate in one of three regimes, namely high regime, low regime and synchronous mode.

In high regime, in which the transmission operates at ratios from synchronous mode ratio to deep overdrive, the high regime clutch H is engaged and the low regime clutch L is disengaged. This allows the output of the mixing epicyclic gear set E1, which receives inputs from both the input discs 10 and the output discs 12 of the variator V, to be transmitted to the system output shaft 24 from output planet gears PX1 of the first epicyclic gear set E1, the output sun gear S2, the intermediate output shaft 22 and the high regime clutch H. An output from the other output planet gears PY1 of the first mixing epicyclic gear set E1 is also transmitted to the second epicyclic gear set E2, but since the low regime clutch L is disengaged, the output is not transmitted to the carrier C2 and indeed the carrier C2 merely rotates with the system output shaft 24 to which it is connected. If sun gears S1 and S2 are of the same diameter, the intermediate shaft 22 will rotate at the same speed as the variator output shaft 18. However varying the relative sizes of gears S1 and S2 will create a second epicyclic functioning much as the low regime gear train. Consequently the arrangement simply allows power recirculation to take place via the variator V in high-regime operation. The synchronous shift point can then be determined independently of the ratio spread of the variator.

In low regime, in which the transmission operates from full reverse, through "geared neutral" to synchronous mode ratio, the high regime clutch H is disengaged and the low regime clutch L is engaged. Disengagement of the high regime clutch H isolates the system output shaft 24 from the output planet gear PX1 of the mixing epicyclic gear set E1. Furthermore, engagement of the low regime clutch L allows the output drive from the first mixing epicyclic gear set E1 to the second epicyclic gear set E2 to be transferred to the carrier C2 of the second epicyclic gear set E2 by providing a reaction force from the transmission casing 40. The drive is then transmitted to the second tubular intermediate output shaft 32 and thence to the system output shaft 24.

Moving from high regime to low regime or vice versa can be achieved in so-called "synchronous mode" in which the transmission operates in a condition in which the intermediate output shaft 22 leading from the mixing epicyclic gear set E1 and the second tubular intermediate output shaft 32 leading from the second epicyclic gear set E2 rotate at (or very near) the same speed. In order to change regime, the clutch of the new regime is engaged, whereby both clutches are simultaneously engaged for a short time and the clutch of the old regime is then disengaged.

It will be observed that in low-regime, the only gears which are actively engaged in the mixing epicyclic gear set E1 are the planetary gears P1 and PY1, thereby minimising the losses which occur in the mixing epicyclic gear train E1, particularly in power recirculation mode. In high regime operation, there are no more meshes than prior art transmissions. However, it should also be noted that the present invention allows the use of a mixing epicyclic gear set E1 which does not have an annulus or ring gear. Not only does this reduce the weight of the transmission, but it also allows greater flexibility with the selection of the relative sizes of planetary gears P1, PX1 and PY1. This in turn allows the speed of the components to be reduced and reduces the number of meshes to a minimum.

Figure 2:
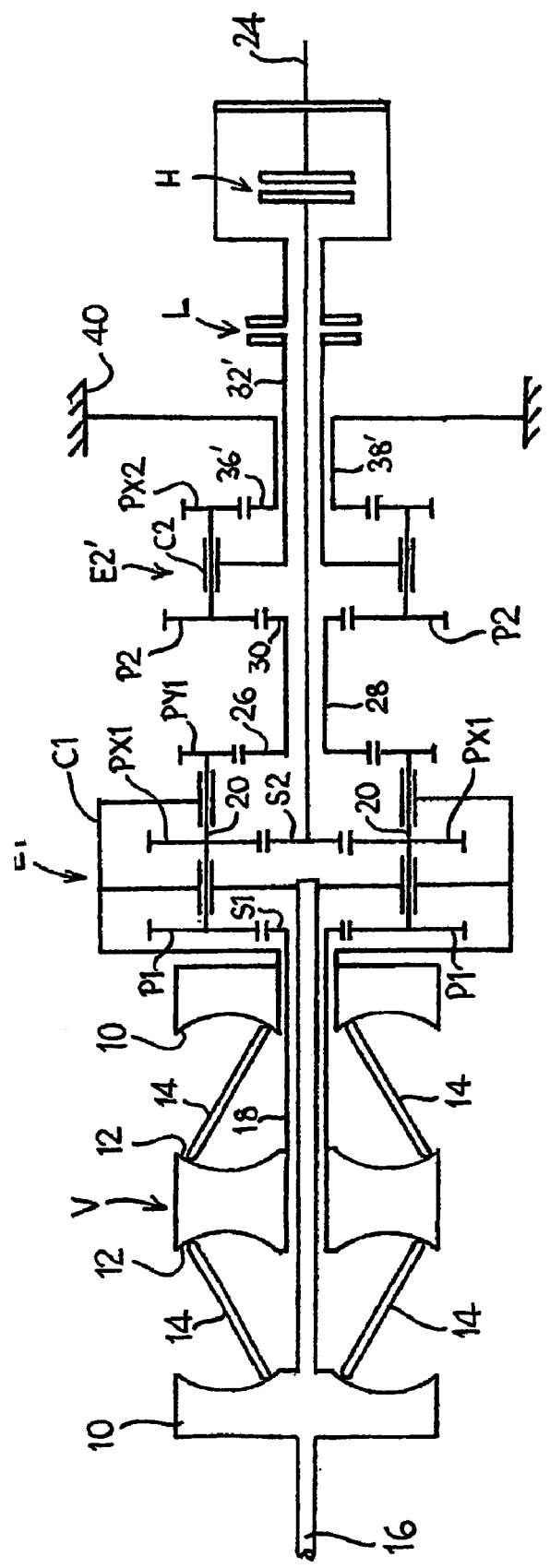
FIG. 2 is a diagrammatic illustration of a second embodiment of continuously variable transmission in accordance with the present invention, as a modification of the embodiment of FIG. 1.

The embodiment of FIG. 2 is very similar to that of FIG. 1, the only significant difference being the location of the low-regime braking member. Features of the FIG. 2 embodiment which correspond to features of the FIG. 1 embodiment are indicated by the same reference numerals and only the differences in construction will be described.

The differences relate to the second epicyclic gear set, identified as E2' in FIG. 2. The planet gears P2 and PX2 are identical to those of the first embodiment but the sun gear 36' is fixedly connected to the transmission casing 40. Drive from the second tubular intermediate output shaft 32' is taken continuously from the carrier C2 and is selectively connected to the system output shaft 24 by means of a low-regime clutch L'.

The FIG. 2 variation has the advantage that when the low-regime clutch L' is disengaged, the second epicyclic gear train E2' is completely disengaged from the system output shaft 24 (as opposed to the first embodiment where the intermediate output shaft 32 is always engaged to the system output shaft 24), whereby any problem arising from the second epicyclic gear set during high-regime operation is not transmitted to the system output shaft 24.

The invention is not restricted to the details of the foregoing embodiments. In particular, variators of types other than that described can be used. Moreover, the sizes of the gears may be varied to suit the particular circumstances. For example, in the embodiments described, the sun gear S1 of the epicyclic gear train is the same size as the output sun gear S2. However, instead of being the same sizes S1 maybe larger than, or smaller than, S2 if appropriate.

The invention claimed is:

1. A multi-regime, continuously variable ratio transmission system, comprising:
   coaxial system input and output shafts;
   a continuously variable ratio transmission unit (variator) connected coaxially to the system input shaft and having a coaxial variator output shaft; and
   a mixing epicyclic gear train having an input sun gear drivably connected to the variator output shaft, a planet carrier drivably connected to the system input shaft and a first planet gear mounted on the planet carrier and drivingly engaged with the input sun gear;
   wherein the first planet gear drives a first intermediate output shaft which is arranged coaxially with the system input shaft and which is selectively connectable to the system output shaft via a first clutch in a high-regime operation of the transmission operating from synchronous mode ratio to high forward ratio;
   and the first planet gear provides the input for a second epicyclic gear train having an output which is selectively connectable to the system output shaft via a braking element in a low-regime operation of the transmission operating from full reverse ratio, through geared neutral to synchronous mode ratio.

2. A transmission system as claimed in claim 1, wherein the first intermediate output shaft is provided with a sun gear which is driven by the first planet gear of the mixing epicyclic gear train.

3. A transmission system as claimed in claim 2, wherein the sun gear on the output shaft is the same size as the input sun gear.

4. A transmission system as claimed in claim 1, wherein an axle of the planet gear of the mixing epicyclic gear train carries a second planet gear which rotates with the first planet gear and drives the first intermediate output shaft.

5. A transmission system as claimed in claim 4, wherein the second planet gear is the same size as the first planet gear.

6. A transmission system as claimed in claim 4, wherein the axle of the first planet gear of the mixing epicyclic gear train carries a third planet gear which rotates with the first planet gear and provides the input for the second epicyclic gear train.

7. A transmission system as claimed in claim 1, wherein the second epicyclic gear train comprises a second input sun gear driven by the mixing epicyclic gear train, a planet gear driven by the second input sun gear and a planet carrier forming the output of the second epicyclic gear train.

8. A transmission system as claimed in claim 7, further comprising intermediate gearing connecting the mixing epicyclic gear train and the second input sun gear.

9. A transmission system as claimed in claim 7, wherein the second epicyclic gear train comprises a second sun gear engaged with the planet gear of the second epicyclic gear train.

10. A transmission system as claimed in claim 9, further comprising means for selectively braking the second sun gear.

11. A transmission system as claimed in claim 10, wherein the means for selectively braking comprises a clutch interposed between the second sun gear and a transmission system casing.

12. A transmission system as claimed in claim 11, wherein the sun gear is held stationary with respect to the transmission casing and the means for selectively braking further comprises clutch means for selectively connecting the output of the second epicyclic gear train to the system output shaft.

13. A transmission system as claimed in claim 2, wherein an axle of the planet gear of the mixing epicyclic gear train carries a second planet gear which rotates with the first planet gear and drives the first intermediate output shaft.

14. A transmission system as claimed in claim 3, wherein the axle of the first planet gear of the mixing epicyclic gear train carries the second planet gear which rotates with the first planet gear and drives the fast intermediate output shaft.

15. A transmission system as claimed in claim 5, wherein the axle of the first planet gear of the mixing epicyclic gear train carries a third planet gear which rotates with the first planet gear and provides the input for the second epicyclic gear train.

16. A transmission system as claimed in claim 2, wherein the second epicyclic gear train comprises a second input sun gear driven by the mixing epicyclic gear train, a planet gear driven by the second input sun gear and a planet carrier forming the output of the second epicyclic gear train.

17. A transmission system as claimed in claim 3, wherein the second epicyclic gear train comprises a second input sun gear driven by the mixing epicyclic gear train, a planet gear driven by the second input sun gear and a planet carrier forming the output of the second epicyclic gear train.

18. A transmission system as claimed in claim 4, wherein the second epicyclic gear train comprises a second input sun gear driven by the mixing epicyclic gear train, a planet gear driven by the second input sun gear and a planet carrier forming the output of the second epicyclic gear train.

19. A transmission system as claimed in claim 5, wherein the second epicyclic gear train comprises a second input sun gear driven by the mixing epicyclic gear train, a planet gear driven by the second input sun gear and a planer carrier forming the output of the second epicyclic gear train.

20. A transmission system as claimed in claim 6, wherein the second epicyclic gear train comprises a second input sun gear driven by the mixing epicyclic gear train, a planet gear driven by the second input sun gear and a planet carrier forming the output of the second epicyclic gear train.

* * * * *